(12) United States Patent
Breen et al.

(10) Patent No.: US 7,545,120 B2
(45) Date of Patent: Jun. 9, 2009

(54) AC-DC ADAPTER AND BATTERY CHARGER INTEGRATION FOR PORTABLE INFORMATION HANDLING SYSTEMS

(75) Inventors: John J. Breen, Harker Heights, TX (US); Brent A. McDonald, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 10/628,921

(22) Filed: Jul. 29, 2003

(65) Prior Publication Data

US 2005/0024016 A1  Feb. 3, 2005

(51) Int. Cl.
H02J 7/00 (2006.01)
H02J 7/04 (2006.01)
H02J 7/02 (2006.01)
H02J 7/16 (2006.01)

(52) U.S. Cl. ............... 320/145; 320/137; 320/134; 320/141; 320/111; 320/149; 323/280; 323/234

(58) Field of Classification Search ........... 320/111, 320/140, 141, 149, 162, 164; 323/234
See application file for complete search history.

(56) References Cited

U.S. PATENT DOCUMENTS

| | | | |
|---|---|---|---|
| 4,728,808 A | 3/1988 | Bet-Esh et al. | |
| 5,122,729 A | 6/1992 | Itoga et al. | |
| 5,422,562 A | 6/1995 | Mammano et al. | |
| 5,796,238 A | 8/1998 | Hiratsuka et al. | |
| 5,838,141 A | 11/1998 | Sengupta et al. | |
| 5,847,546 A | 12/1998 | Sengupta et al. | |
| 5,864,220 A * | 1/1999 | Reipur et al. | 320/134 |
| 5,903,764 A | 5/1999 | Shyr et al. | |
| 5,941,714 A * | 8/1999 | Gorbet et al. | 439/38 |
| 5,942,885 A | 8/1999 | Nemoto et al. | |
| 5,994,878 A * | 11/1999 | Ostergaard et al. | 320/132 |
| 5,994,885 A * | 11/1999 | Wilcox et al. | 323/285 |
| 6,025,698 A | 2/2000 | Kim et al. | |
| 6,104,162 A * | 8/2000 | Sainsbury et al. | 320/111 |
| 6,160,722 A | 12/2000 | Thommes et al. | |
| 6,184,660 B1 * | 2/2001 | Hatular | 320/141 |
| 6,184,731 B1 | 2/2001 | Nagaoka | |
| 6,268,714 B1 | 7/2001 | Yang | |
| 6,275,011 B1 | 8/2001 | Yang | |
| 6,377,030 B1 | 4/2002 | Asao et al. | |
| 6,522,105 B2 | 2/2003 | Kodama et al. | |
| 7,183,748 B1 * | 2/2007 | Unno et al. | 320/136 |

* cited by examiner

*Primary Examiner*—Edward Tso
*Assistant Examiner*—Alexis Boateng
(74) *Attorney, Agent, or Firm*—Haynes and Boone, LLP

(57) ABSTRACT

In a method and system for converting an alternating current (AC) input to a direct current (DC) output, an AC-DC adapter includes a rectifier module operable to receive the AC input and generate a first DC output. The AC-DC adapter includes a buck converter module operable to receive the first DC output and generate the DC output responsive to a control signal. A controller module, included in the AC-DC adapter is operable to receive a first feedback signal input indicative of a target voltage required by a load and a second feedback signal input indicative of the DC output to generate the control signal. The controller module adjusts the control signal responsive to the first and second feedback signal inputs so that the DC output is maintained to be within a predefined range of the target voltage.

15 Claims, 5 Drawing Sheets

AC-DC ADAPTER AND BATTERY CHARGER INTEGRATION FOR PORTABLE INFORMATION HANDLING SYSTEMS

BACKGROUND

The present disclosure relates generally to information handling systems, and more particularly to techniques for integrating AC-to-DC adapter and battery charger devices commonly used to provide power to portable information handling system components such as notebook computers, personal digital assistants (PDA), cellular phones and gaming consoles.

As the value and use of information continues to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A battery converts chemical energy within its material constituents into electrical energy in the process of discharging. A rechargeable battery is generally returned to its original charged state (or substantially close to it) by a charging process such as by passing an electrical current in the opposite direction to that of the discharge. Presently well known rechargeable battery technologies include Lithium Ion (LiON), Nickel Cadmium (NiCd), and Nickel Metal Hydride (NiMH). In the past, the rechargeable batteries (also known as "dumb" batteries) provided an unpredictable source of power for the portable devices, since typically, a user of the device powered by the battery had no reliable advance warning that the energy supplied by the rechargeable battery was about to run out.

Today, through the development of "smart" or "intelligent" battery packs, batteries have become a more reliable source of power by providing information to the IHS and eventually to a user as to the state of charge, as well as a wealth of other information. The "smart rechargeable battery", which is well known, is typically equipped with electronic circuitry to monitor and control the operation of the battery. A smart battery system, which typically includes at least one smart battery, is operable to provide power to a portable device.

FIG. 1 illustrates a typical multi-tier power supply system 100 operable to provide power to a load (not shown), according to prior art. Typically, the power supply system 100 receives and converts an alternating current (AC) power input 110 to a direct current power (DC) output 120 to power the load such as a portable IHS device 101 or components thereof. Traditional power supply systems utilize a two-stage power conversion process. The AC power input 110 is generally received from a 120 V, 60 hertz or 220 V, 50 hertz signal source from a wall outlet 105.

An AC-DC adaptor 130 included in the power supply system 100 forms the first stage of the two-stage conversion process. The AC-DC adaptor 130 converts the AC voltage input 110 to a first DC voltage output 115 to provide DC power to a system power rail block 140 and a charger device 150. The system power rail block 140 provides DC power to one or more DC-DC converters and other components of the IHS device 101.

The first DC voltage output 115, which is input to the system power rail block 140 is nominally set to approximately 19.6 V, which is sufficiently high to charge a battery 160, included in the power supply system 100, to a fully charged state. The AC-DC adaptor 130 typically utilizes a well-known 'buck converter' design (not shown) for the power conversion.

The second-stage of the power conversion process generally includes at least one DC-DC converter (also referred to as a regulator). The charger device 150, included in the power supply system 100, typically forms the second-stage of the power conversion process. The charger device 150 generally converts the first DC voltage output 115 of the AC-DC adaptor 130 to a lower DC voltage 119 suitable to charge the battery 160 included in the power supply system 100.

The system power rail block 140 and the battery 160 select the DC voltage output 120 to provide power to other downstream components of the IHS device. Power supply systems may utilize a plurality of DC-DC converters to convert the DC voltage output 120 of the power supply system 100 to multiple DC voltage levels of varying value. For example, in one application, a DC-DC converter 170 providing power to a processor 175 of the portable IHS device forms another stage of the power conversion process. This DC-DC converter 170 converts a battery voltage of approximately 12 VDC to a processor voltage of approximately 1.5 VDC. Other individual components (not shown) of the IHS device 101 may require other voltage levels.

A controller (not shown) included in the portable IHS device 101 is used for controlling the selection and operation of the battery 160 and AC power source 105 using various switches (not shown). Thus, the controller operating in conjunction with the battery 160, and the charger 150 controls the charging and discharging operation of the battery 160, as well as flow of power from the source 105 to a load, e.g., the device 101 by controlling the operation of these switches. The controller may control the battery 160 and the charger 150 via well-known System Management Bus (SMBus) (not shown), and/or via dedicated, electrically conducting lines or paths.

Voltage required to charge a battery may vary depending on the manufacturer. For example, Dell Computer Corporation (Round Rock, Tex., USA) provides 4 Series & 3 Series smart batteries for use in notebook computers such as a Dell Latitude™ D-Series dual battery notebook computer. The 4SXP smart battery has a stack voltage of approximately (12V-16.8V) and the 3SXP smart battery has a stack voltage of approximately (9V-12.6V). The trend is towards the development of newer batteries having a lower stack voltage such as approximately (6-9V).

Power consumed by the processor 175 is increasing from one technology generation to the next. The supply voltage required by the processor 175 is also decreasing and is anticipated to fall below 1 Volt. The combination of lower voltages and higher currents make voltage regulation a more challenging task. One approach to improved voltage regulation is to narrow the voltage range of the charger device voltage output.

This approach, however, often results in increasing the size and complexity of the charger device located within the portable IHS device, which often results in increased board space and thermal cooling requirements. In addition, this approach will result in a 3-stage power conversion process, e.g., AC-DC adapter 130 to the charger 150 to downstream regulators such as the DC-DC converter 170.

As described earlier, present power supply systems have a multi-tier power conversion architecture. This multi-tiered approach to power conversion is inefficient, increases heat dissipation, and reduces the amount of time the portable device may be used in a battery-operated mode. The high voltage of the AC-DC adaptor 130 generally results in poor efficiency due to low duty cycles, resulting in higher than desired switching losses. Power losses at each power conversion stage also result in costly thermal solutions and increased system skin temperatures. DC-DC regulators generally cannot be optimized for battery operation given thermal limitations when operating from the AC-DC adapter 130. To account for these power conversion losses, the AC-DC adapter 130 capacity is generally increased thereby driving up the adapter size and cost.

Therefore, a need exists to develop techniques for improving the efficiency of power conversion devices commonly used to provide power to portable IHS components. More specifically, a need exist to develop an efficient power conversion architecture that is less expensive and more reliable than such systems and methods heretofore available. Accordingly, it would be desirable to provide tools and techniques for integrating power conversion devices such as the AC-DC adapter 130 and the charger device 150 included in an IHS absent the disadvantages found in the prior methods and systems discussed above.

SUMMARY

The foregoing need is addressed by the teachings of the present disclosure, which relates to a system and method for integrating the selection and operation of power from battery and system power sources used to provide energy to portable information handling system devices. According to one embodiment, a system for converting an alternating current (AC) input to a direct current (DC) output includes an AC-DC adapter. The AC-DC adapter includes a rectifier module operable to receive the AC input and generate a first DC output and a buck converter module operable to receive the first DC output and generate the DC output responsive to a control signal. A controller module, also included in the AC-DC adapter, is operable to receive a first feedback signal input indicative of a target voltage required by a load and a second feedback signal input indicative of the DC output to generate the control signal. The controller module adjusts the control signal responsive to the first and second feedback signal inputs so that the DC output is maintained to be within a predefined range of the target voltage.

In one embodiment, a method for converting the AC input to the DC output, the DC output providing power to a load, includes receiving the alternative current (AC) input. A first feedback signal indicative of a target voltage required by the load is received and a second feedback signal indicative of the DC output is received. The DC output is generated responsive to the first and second feedback signals so that the DC output is maintained within a predefined range of the target voltage.

Several advantages are achieved by the method and system according to the illustrative embodiments presented herein. The embodiments advantageously provide for lower costs, improved power conversion efficiency and reduced heat generation as a result of reduced number of power conversion stages.

DETAILED DESCRIPTION

Novel features believed characteristic of the present disclosure are set forth in the appended claims. The disclosure itself, however, as well as a preferred mode of use, various objectives and advantages thereof, will best be understood by reference to the following detailed description of an illustrative embodiment when read in conjunction with the accompanying drawings. The functionality of various devices, modules or components described herein may be implemented as hardware (including circuits), firmware and/or software, depending on the application requirements.

In traditional, multi-tier, power conversion architecture the cumulative effect of the losses at each stage generally results in increasing the size and cost of the AC-DC adapter. Therefore, a need exists to develop an efficient power conversion architecture that is more efficient, occupies less board space in portable IHS and generates less heat. According to one embodiment, a system for converting an alternating current (AC) input to a direct current (DC) output includes an AC-DC adapter. The AC-DC adapter advantageously integrates the charging device to reduce the number of layers in the power conversion architecture. The integrated AC-DC module includes a rectifier module operable to receive the AC input and generate a first DC output and a buck converter module operable to receive the first DC output and generate the DC output responsive to a control signal. A controller module, also included in the AC-DC adapter, is operable to receive a first feedback signal input indicative of a target voltage required by a load and a second feedback signal input indicative of the DC output to generate the control signal. The controller module adjusts the control signal responsive to the first and second feedback signal inputs so that the DC output is maintained to be within a predefined range of the target voltage.

Figure 2:
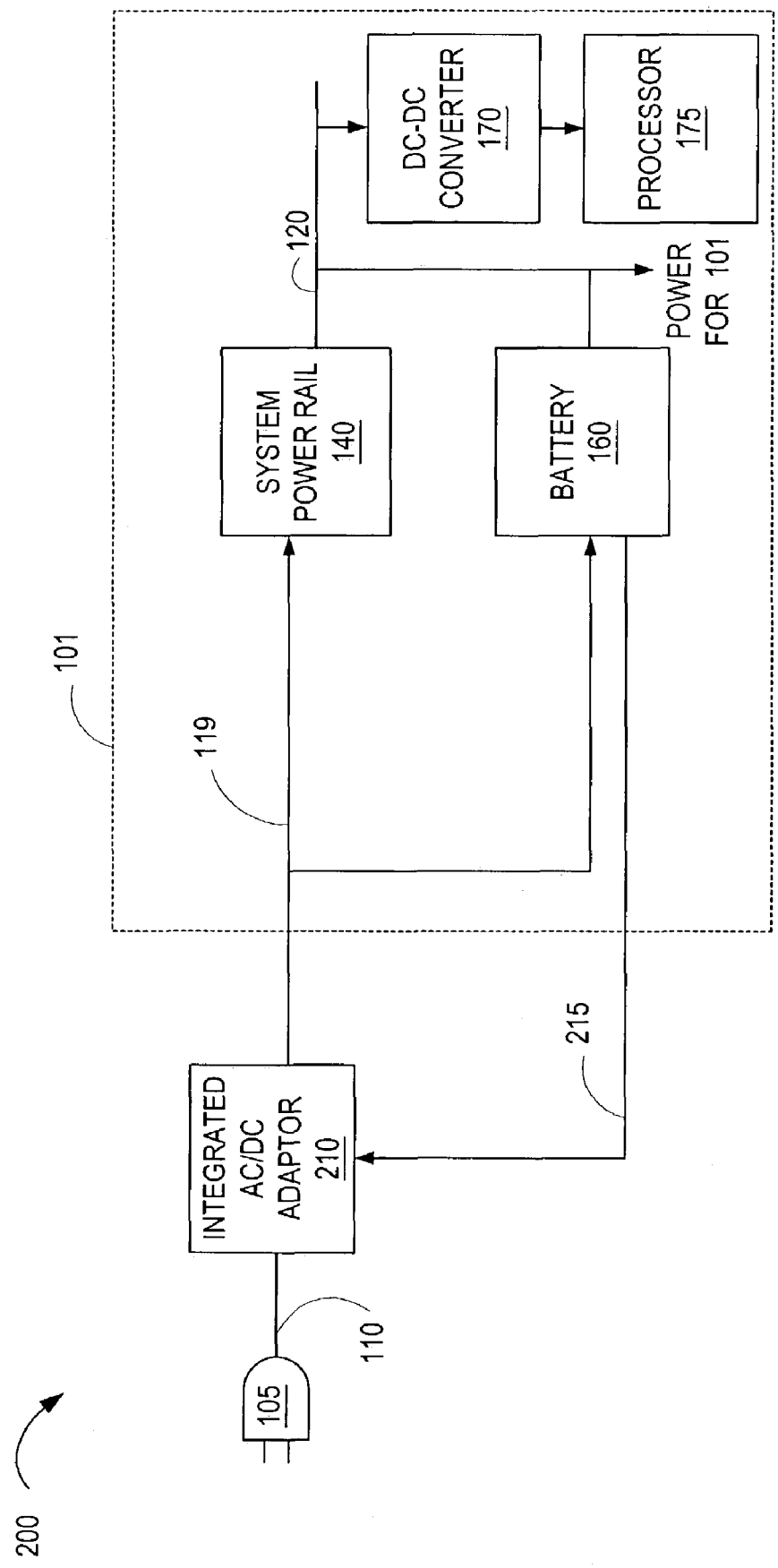
FIG. 2 illustrates a diagrammatic representation of an integrated power supply system used to provide power to a load, according to an embodiment.

FIG. 2 illustrates a diagrammatic representation of an integrated power supply system 200 used to provide power to the portable IHS device 101, according to an embodiment. The integrated power supply system 200 includes: 1) an integrated AC-DC adapter 210, 2) the power rail block 140, and 3) the battery 160. The integrated AC-DC adapter 210 receives the AC input 110, which is typically a 120 V, 60 hertz or 220 V, 50 hertz signal source received from the wall outlet 105. The integrated AC-DC adapter 210 generates the DC voltage 119 output, which may be varied or changed to be suitable to charge the battery 160. In one embodiment, the DC voltage 119 output is the same as the first DC voltage output 115 of the AC-DC adaptor 130. Thus, the integrated AC-DC adapter 210 advantageously eliminates one tier of the power conversion process by converting the AC input 110 directly to a DC voltage output that may be varied so as to be able to charge the battery 160. The system power rail block 140 provides DC power to one or more DC-DC converters such as 170 and other components (not shown) of the IHS device 101. Further details of various modules of the integrated AC-DC adapter 210 are described in FIG. 3.

As described earlier, a controller (not shown) included in the portable IHS device 101 is used for controlling the selection and operation of the battery 160 and the integrated AC-DC adapter 210. Thus, the controller operating in conjunction with the battery 160, and the AC-DC adapter 210 controls the charging and discharging operation of the battery 160, as well as flow of power from the source 105 to a load, e.g., the device 101. The controller may control the battery 160 and the AC-DC adapter 210 via well-known System Management Bus (SMBus) (not shown), and/or via dedicated, electrically conducting lines or paths.

In one embodiment, an external feedback signal 215 is received from the battery 160. The feedback signal 215 is indicative of a target value for the DC voltage 119 output, which is sufficient to charge the battery 160. Because the battery stack voltage is dependent on the type and manufacturer of the battery 160, the battery stack voltage and the target value may vary. Further details of the target value relative to a battery stack voltage are illustrated in a graph in FIG. 4. The feedback signal 215 may be a single channel digital signal, an analog signal, a digital signal superimposed on a DC voltage, a pulse width modulated (PWM) signal, or an SMBus signal. In one embodiment, the integrated AC-DC adapter 210 receives the feedback signal 215 from the controller. In one embodiment, the AC-DC adapter 210 receives feedback signals from the controller and the battery 160 via the SMBus.

In one embodiment, the integrated AC-DC adapter 210 also receives an internal feedback signal (not shown) indicative of a measured value of the DC voltage 119 output. In one embodiment, in the event of a loss of the external feedback signal 215, the AC-DC adapter 210 may be defined to generate a predefined value of the DC voltage 119 output. In one embodiment, the integrated AC-DC adapter 210 may be defined to maintain or hold the last value of the DC voltage 119 output generated just prior to the loss of the external feedback signal 215.

Figure 3:
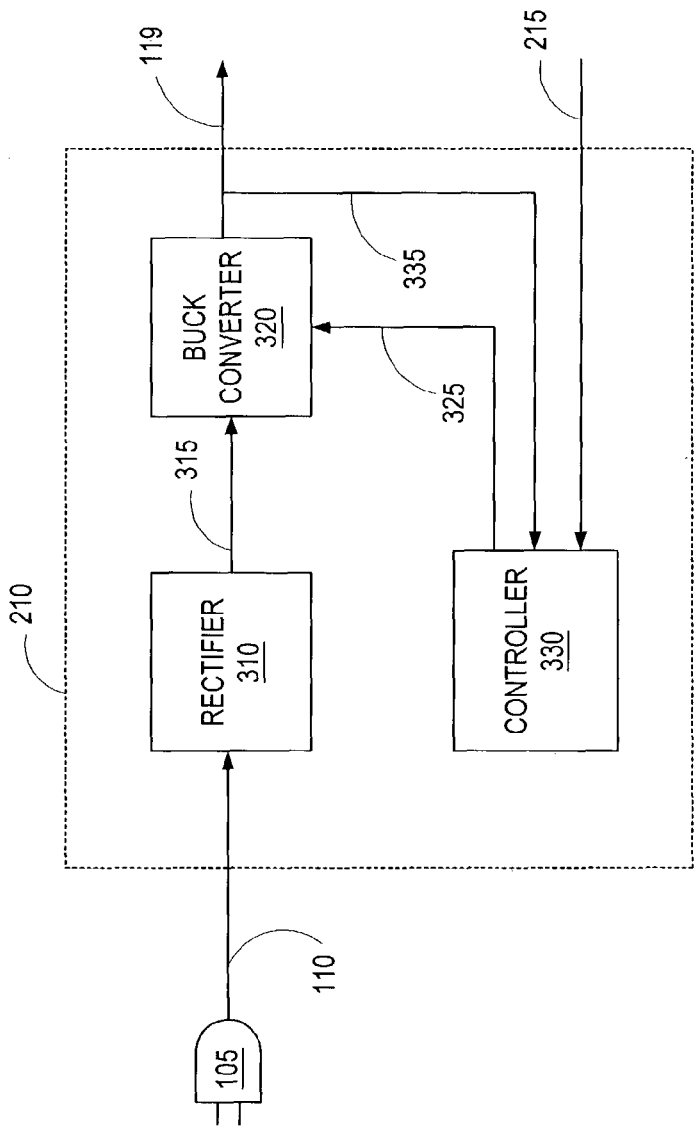
FIG. 3 illustrates more details of the integrated AC-DC adapter illustrated in FIG. 2, according to an embodiment.

FIG. 3 illustrates more details of the integrated AC-DC adapter 210 illustrated in FIG. 2, according to an embodiment. In the depicted embodiment, components of the integrated AC-DC adapter 210 include: 1) a rectifier module 310 operable to receive the AC input 110 and generate a first DC output 315, 2) a buck converter module 320 operable to receive the first DC output 315 and generate the DC voltage 119 output (also referred to as a second DC output) responsive to a control signal 325, and 3) a controller module 330 operable to receive the external feedback signal 215 (also referred to as a first feedback signal input) indicative of the target voltage required by a load such as the device 101 or the battery 160, and an internal feedback signal 335 (also referred to as the second feedback signal input) indicative of the DC voltage 119 output.

The controller module 330 adjusts the control signal 325, responsive to receiving the external and internal feedback signals 215 and 335, so that the buck converter module 320 upon receiving the control signal 325 maintains the DC voltage 119 output to be within a predefined range of the target voltage. The control signal 325 is adjusted so that the difference between the DC voltage 119 output and the target voltage is always positive.

In the depicted embodiment, the DC voltage 119 output provides power to the load, which is the battery 160. Upon insertion of the battery 160, the controller and/or the battery 160 determines a value for the target voltage required to charge the battery 160. The target voltage is transferred to the integrated AC-DC adapter 210 as the external feedback signal 225. The DC voltage 119 output is adjusted to be suitable to charge the battery 160.

As described earlier, in one embodiment, upon a loss of the external feedback signal 225 the controller module 330 generates the control signal 325 to maintain the DC voltage 119 output to a predefined voltage such as 19.6 Volts. In one embodiment, upon a loss of the external feedback signal 225 the controller module 330 generates the control signal 325 to maintain the DC voltage 119 output to a previous voltage value of the DC voltage 119 output measured instantly prior to the loss of the external feedback signal 225.

Figure 4:
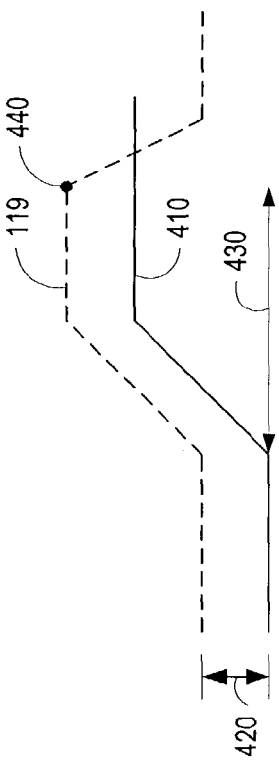
FIG. 4 illustrates a graph of the DC voltage output of the integrated AC-DC adapter tracking a battery stack voltage, according to an embodiment.

FIG. 4 illustrates a graph of the DC voltage 119 output tracking a battery stack voltage 410, according to one embodiment. The integrated AC-DC adapter 210 generates the DC voltage 119 output which varies responsive to the changing voltage and/or current requirements of the battery stack voltage 410 of the battery 160. The target value (not shown), which may be substantially close to the DC voltage 119 output, is defined to be sufficiently higher than the battery stack voltage 410 to enable the charging of the battery 160.

During a charging phase 430 of the battery 160, a difference, deltaV, 420 between the DC voltage 119 output and the target voltage is always positive. Upon completion of the charging phase 430 such as at an end of charge 440 point, the battery stack voltage 410 is fully charged and the DC voltage 119 output is advantageously reduced to a predefined value to reduce the amount of heat generated. The charging phase 430 is resumed when a relative state of charge (RSOC) of the battery 160 drops below a threshold level.

In one embodiment, the DC voltage 119 output is controlled to be within a predefined range, which includes a minimum value slightly above 100% of the target voltage and a maximum value slightly below 125% of the target voltage. The minimum and maximum values selected may vary depending on the application requirements.

Figure 5:
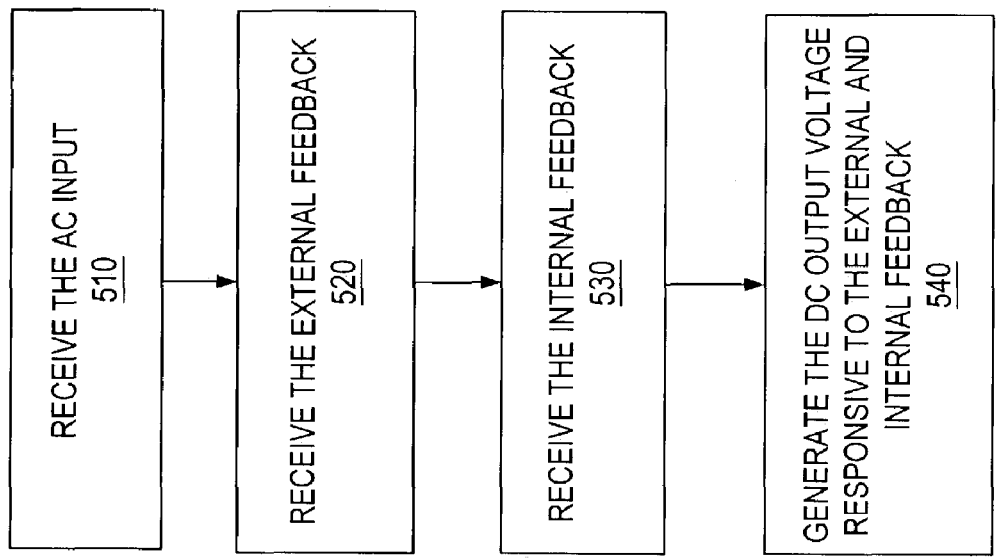
FIG. 5 is a flow chart illustrating a method for converting an AC input to the DC voltage output, according to an embodiment.

FIG. 5 is a flow chart illustrating a method for converting the AC input 110 to the DC voltage 119 output, according to an embodiment. The DC voltage 119 output provides power to a load such as the battery 160. In step 510, the AC input 110 is received. In step 520, the external feedback signal 225, which is indicative of the target voltage required by the battery 160 is received. In step 530, the internal feedback signal 335 indicative of the DC voltage 119 output is received. In step 540, the DC voltage 119 output is generated responsive to the external and internal feedback signals 225 and 335 so that the DC voltage 119 output is maintained within a predefined range of the target voltage.

Various steps described above may be added, omitted, combined, altered, or performed in different orders. For example, steps 510, 520 and 530 may be combined into a single 'receiving' step.

Figure 6:
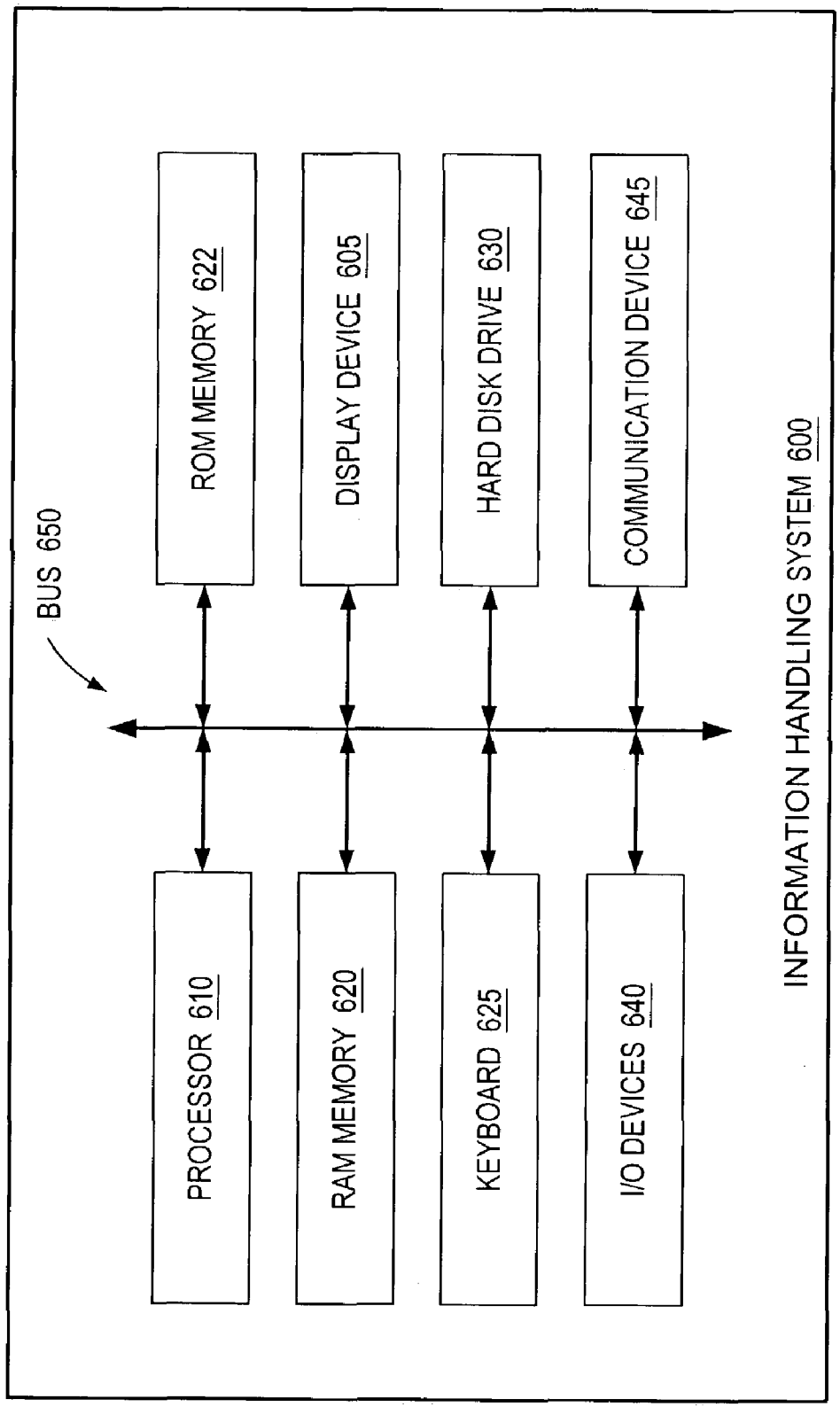
FIG. 6 illustrates a block diagram of an information handling system to implement method or apparatus aspects of the present disclosure, according to an embodiment.

FIG. 6 illustrates a block diagram of an information handling system to implement method or apparatus aspects of the present disclosure, according to an embodiment. For purposes of this disclosure, an information handling system 600 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, the information handling system 600 may be a personal computer, a network storage device, or any other suitable device and may vary in size, shape, performance, functionality, and price.

The information handling system 600 may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring to FIG. 6, the information handling system 600 includes a processor 610, a system random access memory (RAM) 620, a system ROM 622, a display device 605, a keyboard 625 and various other input/output devices 640. It should be understood that the term "information handling system" is intended to encompass any device having a processor that executes instructions from a memory medium. The information handling system 600 is shown to include a hard disk drive 630 connected to the processor 610 although some embodiments may not include the hard disk drive 630. The processor 610 communicates with the system components via a bus 650, which includes data, address and control lines. A communications device 645 may also be connected to the bus 650 to enable information exchange between the system 600 and other devices (not shown).

Figure 1:
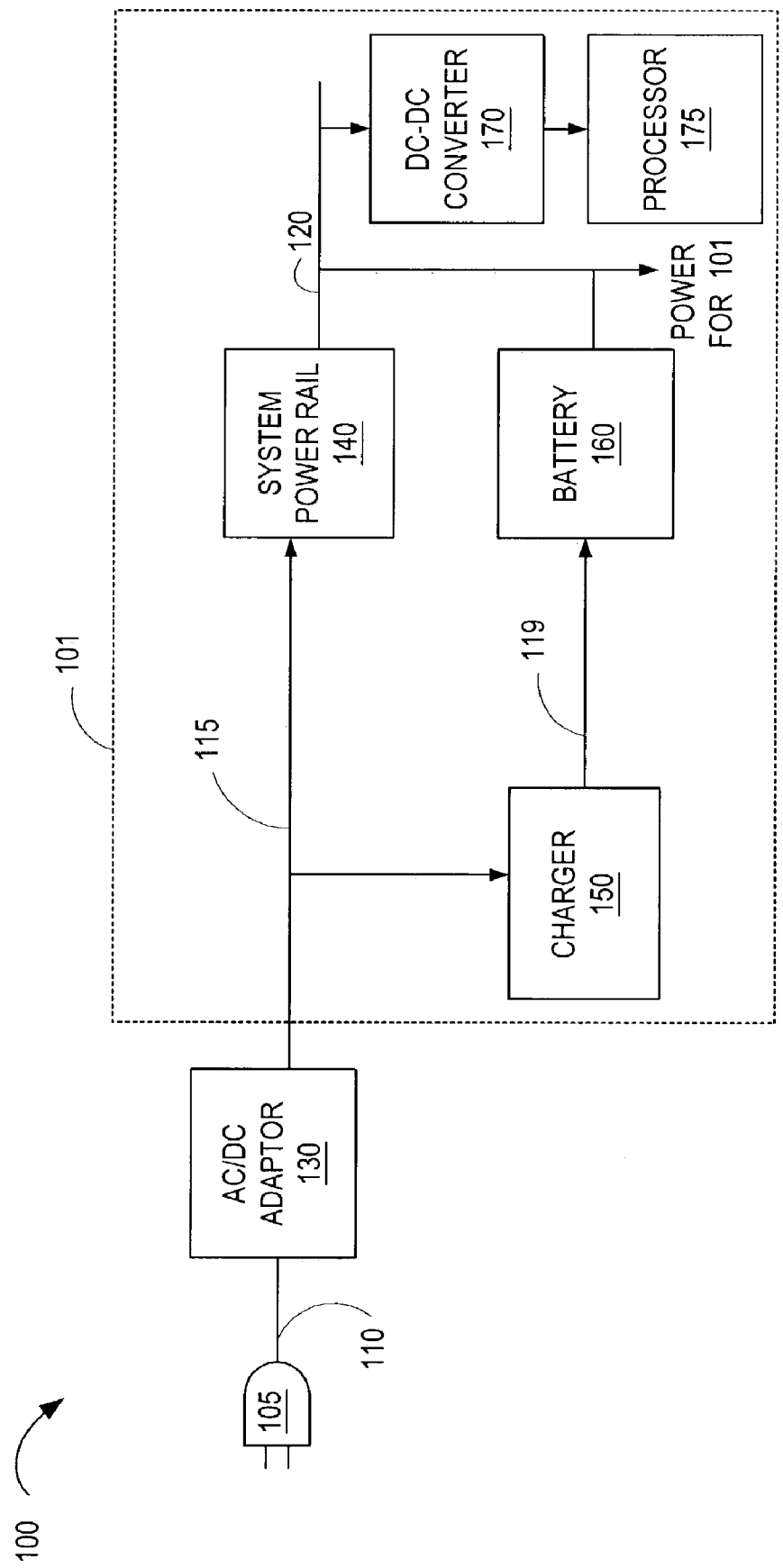
FIG. 1, described above, illustrates a typical multi-tier power supply system operable to provide power to a load, according to the prior art.

In one embodiment, the information handling system 600 may be used to implement the portable information handling system device 101 described in FIG. 1. In this embodiment, the processor 175 is the same as the processor 610. The battery 160 (not shown) may be configured to provide power to the information handling system 600.

The processor 610 is operable to execute the computing instructions and/or operations of the information handling system 600. The memory medium, e.g., RAM 620, preferably stores instructions (also known as a "software program") for implementing various embodiments of a method in accordance with the present disclosure. In various embodiments the one or more software programs are implemented in various ways, including procedure-based techniques, component-based techniques, and/or object-oriented techniques, among others. Specific examples include assembler, C, XML, C++ objects, Java and Microsoft Foundation Classes (MFC). For example, in one embodiment, the BIOS program described may be implemented using an assembler language code.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method for converting an alternating current (AC) input to a direct current (DC) output, the DC output providing power to a load, the method comprising:
   receiving the alternative current (AC) input;
   receiving a first feedback signal indicative of a target voltage required by the load, wherein the first feedback signal is an external feedback;
   receiving a second feedback signal indicative of the DC output, wherein the second feedback signal is an internal feedback;
   providing a controller module included in an AC-DC adapter and operable to receive the first feedback signal and the second feedback signal;
   providing a converter in the AC-DC adapter;
   the controller module adjusting a control signal, responsive to receiving the first and second feedback signals, to the converter to maintain the DC output within a predefined range of the target voltage; and
   during a charging phase, a difference between the DC output and the target voltage is always positive while providing a charge to the load, and the DC output is reduced to a predefined value upon completion of providing the charge to the load.

2. The method of claim 1, wherein the second DC output provides power to the load, wherein the load is a battery.

3. The method of claim 2, wherein the DC output is suitable to charge the battery.

4. The method of claim 1, wherein upon a loss of the first feedback signal the DC output is maintained at the predefined voltage.

5. The method of claim 4, wherein the predefined voltage is equal to a previous voltage value of the DC output measured instantly prior to the loss of the first feedback signal.

6. The method of claim 1, wherein the first feedback signal is received from the load.

7. The method of claim 1, wherein the first feedback signal is received from a controller operable to control the load.

8. The method of claim 1, wherein the first feedback signal is received as a single digital signal, a pulse width modulation (PWM) signal, an analog signal, a digital signal superimposed on another analog signal, or an SMBus signal.

9. An integrated alternating current (AC) to direct current (DC) adapter comprising:
   a rectifier module operable to receive an AC input and generate a first DC output;
   a buck converter module operable to receive the first DC output and generate a second DC output responsive to a control signal;
   an AC-DC adapter;
   a controller module included in the AC-DC adapter and operable to receive a first feedback signal input indicative of a target voltage required by a load, wherein the first feedback signal is an external feedback, and a second feedback signal input indicative of the second DC output, wherein the second feedback signal is an internal feedback, the controller module adjusting the control signal, responsive to the first and second feedback signal inputs, to the buck converter module to maintain the second DC output to be within a predefined range of the target voltage; and
   during a charging phase, a difference between the second DC output and the target voltage is always positive while providing a charge to the load, and the second DC output is reduced to a predefined value upon completion of providing the charge to the load.

10. The adapter of claim 9, wherein the second DC output provides power to the load, wherein the load is a battery.

11. The adapter of claim 10, wherein the second DC output is suitable to charge the battery.

12. The adapter of claim 9, wherein the first feedback signal is received from the load.

13. The adapter of claim 9, wherein the first feedback signal is received from a another controller operable to control the load.

14. The adapter of claim 9, wherein the first feedback signal is received as a single digital signal, a pulse width modulation (PWM) signal, an analog signal, a digital signal superimposed on another analog signal, or an SMBus signal.

15. An information handling system comprising:
   a processor;
   a system bus;
   a memory coupled to the processor through the system bus; and
   a power supply system operable to provide power to the processor, the bus and the memory, the power supply system being connectable to an alternating current (AC) power source, wherein the power supply system includes:
   a rectifier module operable to receive the AC input and generate a first direct current (DC) output;
   a buck converter module operable to receive the first DC output and generate a second DC output responsive to a control signal;
   an AC-DC adapter;
   a controller module included in the AC-DC adapter and operable to receive a first feedback signal input indicative of a target voltage required by a load, wherein the first feedback signal is an external feedback, and a second feedback signal input indicative of the second DC output, wherein the second feedback signal is an internal feedback, the controller module adjusting the control signal responsive to the first and second feedback signal inputs, to the buck converter module to maintain the second DC output to be within a predefined range of the target voltage; and
   during a charging phase, a difference between the second DC output and the target voltage is always positive while providing a charge to the load, and the second DC output is reduced to a predefined value upon completion of providing the charge to the load.

* * * * *